(12) United States Patent
Fielding et al.

(10) Patent No.: US 6,526,674 B1
(45) Date of Patent: Mar. 4, 2003

(54) GAS DRYER

(75) Inventors: Robert Michael Fielding, Blyth (GB); Colin Thomas Billiet, Gateshead (GB); Desideratus Julius Sienack, Aartsellaar (BE)

(73) Assignee: Domnick Hunter Limited, Co Durham (GB)

( * ) Notice: Subject to any disclaimer, the term of this patent is extended or adjusted under 35 U.S.C. 154(b) by 0 days.

(21) Appl. No.: 09/857,164

(22) PCT Filed: Dec. 9, 1999

(86) PCT No.: PCT/GB99/04083
§ 371 (c)(1), (2), (4) Date: Jun. 1, 2001

(87) PCT Pub. No.: WO00/33944
PCT Pub. Date: Jun. 15, 2000

(30) Foreign Application Priority Data

Dec. 9, 1998 (GB) ............................................... 9827021
Dec. 9, 1998 (GB) ............................................... 9827023

(51) Int. Cl.[7] ................................................. F26B 21/06
(52) U.S. Cl. ................................. 34/80; 34/74; 34/130; 96/125; 96/130
(58) Field of Search .............................. 34/74, 76, 80, 34/130, 187; 96/125, 144, 130

(56) References Cited

U.S. PATENT DOCUMENTS

| | | | |
|---|---|---|---|
| 4,361,425 A | | 11/1982 | Hata |
| 4,659,467 A | * | 4/1987 | Spearman .................... 210/282 |
| 5,110,330 A | * | 5/1992 | Loughran ................... 96/117.5 |
| 5,385,606 A | * | 1/1995 | Sienack ........................ 96/125 |
| 5,427,609 A | * | 6/1995 | Zoglman et al. ............... 95/98 |
| 5,667,566 A | | 9/1997 | Flynn et al. |

FOREIGN PATENT DOCUMENTS

| | | | | |
|---|---|---|---|---|
| DE | 3149830 C | * | 6/1983 | ................ 137/393 |
| EP | 0 856 707 A2 | | 1/1998 | |
| GB | 2 321 603 A | | 8/1998 | |

* cited by examiner

Primary Examiner—Denise L. Esquivel
Assistant Examiner—Kathryn S. O'Malley
(74) Attorney, Agent, or Firm—Maginot, Moore & Bowman (57) ABSTRACT

A drum dryer comprises a drying drum which is arranged for a gas to flow through it to be dried from a first end of the drum to its opposite second end, and a housing in which the drum is located with a space around the drum between the internal wall of the housing and the external surface of the drum. Gas can be directed into the space through a housing inlet, to flow in the space to the first end of the drum where it can be admitted into the drum for drying.

18 Claims, 4 Drawing Sheets

GAS DRYER

The present invention relates to a gas dryer which includes a drying drum containing an adsorbent material, and, in particular, to such a dryer in which a primary gas is dried using the adsorbent material and in which a secondary gas is used to regenerate the adsorbent material.

A drum dryer which can be used in a compressed gas system comprises a housing and a quantity of an adsorbent material within the housing by which fluid in the gas to be dried (the primary gas flow) can be adsorbed. The fluid can be aqueous (especially water) or non-aqueous. It will generally be entrained in the primary gas flow in gaseous form (for example as a vapour), although it can be entrained in liquid form (for example as droplets). The adsorbent material can be regenerated for reuse by means of a secondary gas flow which is supplied to the drum to flow over the adsorbent material which is loaded with adsorbed fluid (generally liquid). The secondary gas flow is usually in the opposite direction to the primary gas flow. Such dryers are particularly used in compressed air processes as dehumidifiers to remove vapour from a compressed gas stream which has been cooled after compression stages. The secondary gas flow which is used to regenerate the adsorbent material can be compressed air at elevated temperature as a result of the compression stage, which is fed through the adsorbent material so as to regenerate it.

An example of a drum dryer is disclosed in U.S. Pat. No. 5,385,603, in which an adsorbent material is arranged in on the surface of a cylindrical drum which is arranged to rotate around its longitudinal axis. The adsorbent material can be define a plurality of parallel channels for gas to flow over the surface of the drum, in a direction that is parallel to the drum axis. The drum and the housing between them can provide partitions by which the housing can be divided into different regions for gas to flow through the drum. One of the regions can be for the primary gas flow in which the adsorbent material adsorbs entrained fluid, and the other of the regions can be for the countercurrent secondary gas flow, which is used to regenerate the adsorbent material by desorbing adsorbed fluid. The drum is driven rotationally by a motor positioned at one end of the axis of rotation. The axis is only supported transversely at the end from which it is driven. The dryer has a system of seals located around the periphery of the drum between the drum and the housing, to keep the primary and secondary gas flows separate. Frictional forces between the drum and the housing can place significant load on the motor by which the drum is made to rotate.

The present invention provides a gas dryer in which gas is introduced into the dryer housing into the space between the internal wall of the housing and the external surface of the drum, to flow in that space to the drum gas inlet.

Accordingly, in one aspect, the invention provides a gas dryer comprising a drying drum which is arranged for a gas to flow through it to be dried from a first end of the drum to its opposite second end, a housing in which the drum is located with a space around the drum between the internal wall of the housing and the external surface of the drum, and a housing inlet for the gas to be dried through which gas can be directed into the said space, to flow in the space to the first end of the drum where it can be admitted into the drum for drying.

The dryer of the invention has the advantage that the flow of the gas in the space between the housing and the drum can provide primary separation of liquid that is entrained to flow with the gas prior to admission of the gas into the drum. This enables the separated liquid to be collected before the gas is admitted to the drum and has the advantage that the adsorbent material in the drum is not exposed to the liquid. Separation is enabled as a result of the surface area that is provided on the housing wall for collection (including condensation) of entrained liquid and vapour. This primary separation facilitates regeneration of the adsorbent material in the drum.

Preferably, the inlet for the gas that is to be treated, and the path that the gas flows along between the inlet and being admitted to the drying drum is such that the gas flows in a generally tangential direction relative to the drum axis. This increases the length of the path along which the gas flows. The centripetal forces to which the gas and any entrained liquid are exposed during tangential flow around the dryer drum encourages primary separation of any entrained liquid from the primary gas flow. Preferably, the inlet is configured to direct the gas into the space for substantially tangential flow, rather than being directed straight at the surface of the drum in the housing. For example, the inlet can be formed as a port in the wall of the housing with the axis of the port arranged generally tangentially with respect to the annular space between the housing and the drum.

Preferably, the cross-section of at least one, especially both, of the drum and the housing is substantially circular. This has the advantage of encouraging smooth flow of the gas in the annular space. It is particularly preferred that the cross-section of the annular space be substantially constant around the dryer. Smooth tangential flow of gas in the space between the housing and the dryer can encourage separation of the gas and liquid entrained therewith. A preferred drying drum has a circular cylindrical shape.

An advantage of introducing the gas that is to be treated into the space between the drum and the housing is that it the pressure of the gas can be reduced as it enters the space. This can give rise to a reduction in the temperature of the gas. This can facilitate condensation of any vapour that is present in the gas flow, which can then separate from the gas flow. It can be preferred for the gas to enter the space through an injector so that there is a localised reduction in gas pressure at the housing inlet. The reduced pressure in the space and the resulting reduction in gas flow velocity ensures that reentrainment of deposited liquid is minimised.

Preferably, the external surface of the drum is provided by a metal jacket. This can facilitate loss of heat from the dryer, in turn facilitating condensation of liquid from the gas that is to be treated as it flows in the annular space between the drum and the housing.

Preferably, the ratio of the distance from the inlet to the first end of the drum to the overall length of the drum is at least about 0.25, preferably at least about 0.45.

The dryer will generally include a drain through which collected liquid can drain from the housing. Preferably, the drain is located towards the first end of the drum, and includes a partition at the first end of the drum which defines a primary gas chamber that communicates with the primary region of the drum, and a secondary gas chamber that communicates with the secondary region of the drum, the dryer including a seal by which a pressure differential between the primary and secondary gas chambers can be substantially maintained. A suitable seal might be provided by two sealing surfaces in moving contact with one another, for example in the form of a bearing seal.

In another aspect, the invention provides a dryer in which the drying drum has a primary region for the primary gas to flow through it in which liquid in the gas is adsorbed by the drum as it flows from a first end of the drum to its opposite second end, and a secondary region for a secondary gas to flow through to regenerate the drum by displacing adsorbed liquid, the drum including a drain at a first end of the housing for removing liquid from the housing, and a partition at the first end of the drum which defines a primary gas chamber that communicates with the primary region of the drum, and a secondary gas chamber that communicates with the secondary region of the drum, the dryer including a liquid trap into which liquid in the primary chamber drains, the partition extending into the trap so that, when the dryer is in use, it extends into collected liquid in the trap to provide a seal against gas flow between the primary and secondary gas chambers. The dryer of the first aspect of the invention can include a drain having these features. The dryer may however include drains with other constructions. The drain might for example be of the kind used conventionally to remove collected liquid from a pressurised gas system, such as disclosed in EP-A-8 1826.

Preferably, the dryer includes a first flow guide at a first end of the drum and a second flow guide at a second end of the drum, which define between them a primary region of the drum for a primary gas to flow through the drum, and a secondary region of the drum for a secondary gas to flow through the drum, the flow guides being mounted for rotation about the drum axis so that boundaries between the primary and secondary regions rotate around the drum, the permeable structure of the drying drum and the flow guides allowing the primary and secondary gases to flow through their respective regions of the drum without significant mixing.

Preferably, the first and second flow guides rotate about a common axis. For example, the dryer can include a drive shaft which passes through the centre of the drying drum, with the first flow guide mounted on the drive shaft at a first end of the drying drum and the second flow guide mounted on the drive shaft at a second end of the drying drum.

Preferably, the dryer includes locating means which urges one or both of the first and second flow guides towards the drying drum. This can help to minimise unwanted loss of gas. Preferably, the first and second flow guides are configured such that the leading edges of the flow guides are maintained at a controlled clearance from the respective ends of the drying drum so as to prevent significant egress of gas from the flow guides, while preventing contact of the guiding edges with the respective ends of the drying drum. The clearance will be kept as small as possible, consistent with avoiding contact between the flow guides and the ends of the drum. The actual clearance will depend on factors such as the accuracy with which the drum is manufactured. If the drum can be manufactured with sufficient control, the clearance between the flow guides and the drum might be as small as 4 mm or less, for example not more than about 2 mm, preferably not more than about 1 mm.

The first flow guide can trace a sector having a fixed first angle over a first end surface of the drying drum as the first flow guide rotates. The flow guide can include a primary gas inlet for the gas that is to be dried; a coalescing device can be included in the primary gas inlet to collect any liquid that is entrained in the flow of the primary gas, for example in the form of a foam material as known for this purpose.

The first flow guide can be divided into primary and secondary gas chambers for (a) the gas that is to be dried as it passes through the primary region of the dryer drum, and (b) the gas that passes through the secondary region of the drum to regenerate it. Preferably, the second flow guide traces a sector over its end surface of the drying drum as the guide rotates, the sector corresponding approximately to the sector traced by the secondary gas chamber of the first flow guide as the first flow guide rotates.

Preferably, the dryer includes a support extending between an internal surface of the housing and a side wall surface of the drying drum, to fix the drum against movement relative to the housing and to support the drum in the housing. The support will generally contact the side wall surface of the drum at a point between its ends. Preferably, the support bears substantially the entire weight of the drying drum. This has the advantage that it enables problems associated with bearing the load of the drum at its ends on a rotating shaft, as in the dryer disclosed in U.S. Pat. No. 5,385,603, to be avoided. The provision of movable flow guides in the dryer of the invention allows the drum to be fixed. This can simplify control over the clearances between the drum and the flow guides, since the location of the more massive drum component can be controlled by virtue of it being fixed to the housing. Having the housing bear the entire weight of the drum facilitates control over the clearances between the drum and the flow guides.

To facilitate manufacture, the housing can have a first part and a second part joined at an interface, with the support is attached to the housing at the interface. Preferably, the housing parts have substantially the same shape and configuration. This reduces inventory during manufacture. The support can be secured to the housing at the interface between the two parts thereof. An example of a suitable support comprises a substantially right angular flange. When the inlet for the gas to be dried is formed as a port in the wall of the first housing part, the corresponding port in the second housing part (of the same configuration as the first housing part) can be used as an outlet for gas that has been dried and has passed through the drum. When the port on the second housing part is not required for outflow of gases, a blanking piece can be provided within it to close it against gas flow.

Preferably, the support extends continuously around the drum and the internal surface of the housing. Such a support can divide the housing into first chamber and second chambers, such that gas can only pass between the first and second chambers through the drum. The inlet for the gas to be dried will generally be provided in one of the housing parts and the outlet for the gas after it has been dried will generally be provided in the other of the housing parts. Generally, at least one, and preferably both, of the inlet and the outlet will be provided in the side walls of the housing parts.

The present invention will now be described, by way of example only, with reference to the accompanying drawings, in which.

Figure 1:
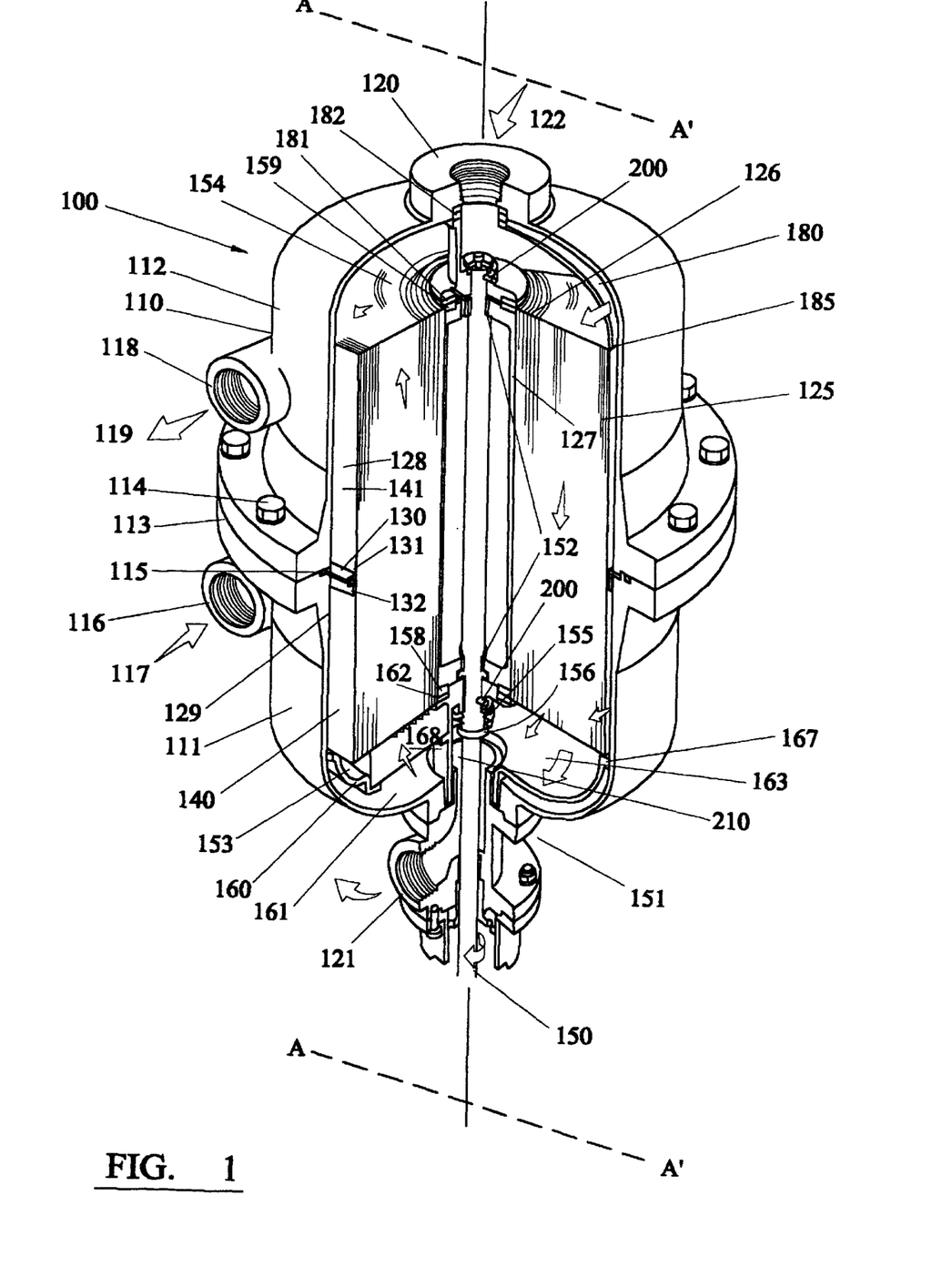
FIG. 1 shows a partially cut away isometric view of a drum dryer according to the invention.

Referring to the drawings, FIG. 1 shows a drum dryer 100 which comprises a housing 110 having a first part 111 and a second part 112, joined at an interface 113 by fasteners 114 in the form of bolts or other such fixing. The housing is a pressure housing and a seal 115 extends around the interface to seal it. The first part of the housing has an inlet port 116 through which a primary gas flow 117 can enter the housing to be dried. The housing also has an outlet port 118 allowing the removal of dried primary gas 119 from the housing.

A secondary gas inlet port 120 is provided at a top end of the housing and a secondary gas outlet port 121 is provided at a bottom end of the housing, for a secondary regenerating gas flow 122 to pass through the housing to regenerate material on which fluid from the primary gas flow has been adsorbed.

A circular cylindrical drying drum 125 is located within the housing. The drying drum comprises a support core 127, an adsorbent material 126 mounted on the support core, and an outer jacket 128 around the adsorbent material. The adsorbent material is provided on a permeable substrate, for example in the form of a corrugated sheet wound spirally around the support core. The outer jacket 128 is in the form of a sleeve of a material which is inert towards the gases to which it is exposed when the drum is in use. Certain stainless steels can be used for many applications. The construction of the drum and the adsorbent materials used in it are generally as used conventionally in drum dryers.

A support 130 extends between an inner surface 129 of the housing and a side wall surface 131 of the drying drum. The support is in the form of a continuous right angular flange which extends around the entire periphery of the inner surface of the housing and the side wall of the drying drum. The support is attached to the drying drum by rivets or other such fastenings and is attached to the housing at the interface and secured to the housing by the interface. A flange part 132 of the support extends into the interface between the first and second housing parts and is trapped between them. The support 130 can support the entire weight of the drying drum so that the drying drum can be freely supported in the housing by the support alone.

The support defines a first chamber 140 and a second chamber 141 in the housing by virtue of it being continuous and extending around the entire periphery of the drum, between the drum and the inner surface of the housing: gas which is to flow within the drum between the first and second chambers must flow through the drum over the adsorbent material. The inlet port 116 allows primary gas to be dried to flow into the first chamber and the outlet port 118 allows primary gas which has been dried to flow out of the secondary chamber after the primary gas has passed through the drying drum.

The inlet port is configured to direct the flow of primary gas to be substantially tangential to a surface internal to the housing. The first chamber is substantially annular owing to the circular cylindrical drying drum located concentric to a circular housing inner surface 129. The inlet port is configured to direct the flow of primary gas to be tangential to the inner surface of the housing and the side wall surface of the drying drum. This configuration facilitates primary separation of the liquid that is entrained in the gas that is to be treated, as described in more detail below.

Drive means 150, in the form of a drive shaft of constant cross section, engages the drum dryer at a driven end 151. The drive shaft passes through the centre of the drying drum and can be driven by means of a motor (not shown). Core support bearing seals 152 are provided to allow rotation of the drive shaft relative to the static drying drum while preventing gas passing through the support core 127. A first flow guide 160 is provided at a first end of the drying drum and a second flow guide is provided at a second end of the drying drum 180. The first and second flow guides are mounted on and concentric to the drive shaft. The first flow guide rotates over a first end surface 153 of the drying drum and the second flow guide rotates over a second end surface 154 of the drying drum. The flow guides rotate about a common longitudinal axis of the drying drum.

Locating means 155, in the form of spring washers, are provided on the drive shaft and act against a drive shaft formation 156 to urge a contact part 161 of the first flow guide against a contact part 158 of the drying drum, and a further contact part of the drying drum 159 against a contact part of the second flow guide 181. The contact parts are provided in the form of bearing seals which allow the flow guides to rotate relative to the support core of the drying drum without allowing gas to pass between them. The bearing seals may be in the form of a dry impregnated fibre gasket. A further bearing seal 182 is provided on the second flow guide to seal the second flow guide and the secondary gas inlet port of the housing. Drive pins 200 extend radially from the drive shaft and engage the first and second flow guides to drive them.

As the support member 130 bears the load of the drying drum, the locating means merely urges the first and second flow guides towards the contact points of the support core of the drying drum to ensure that the flow guides have a correct and controlled position and clearance with regard to other parts of the dryer. The frictional forces resisting rotation of the flow guides are only those arising from the bearing seals. The bearing seals have a small diameter and circumference so that the contact areas and the resulting torsional forces arising therefrom are small compared with those which arise in conventional rotary drum dryers which have seals around the periphery of the rotating drum.

A drain 210 is provided at a bottom end of the housing. An embodiment of drain will be described later with reference to FIGS. 4 and 5.

Figure 2A:
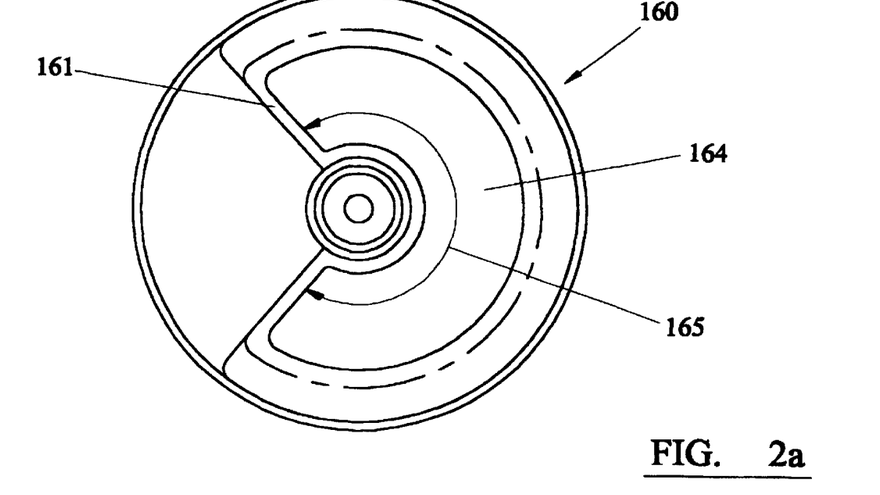
FIGS. 2a, 2b and 2c show top, side and bottom views respectively of a first flow guide part of the invention.
Figure 2B:
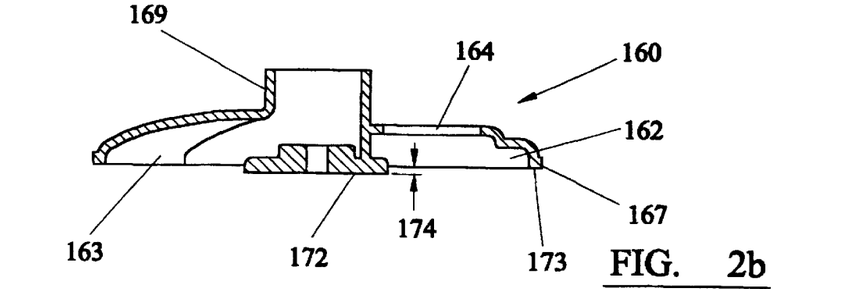
Figure 2C:
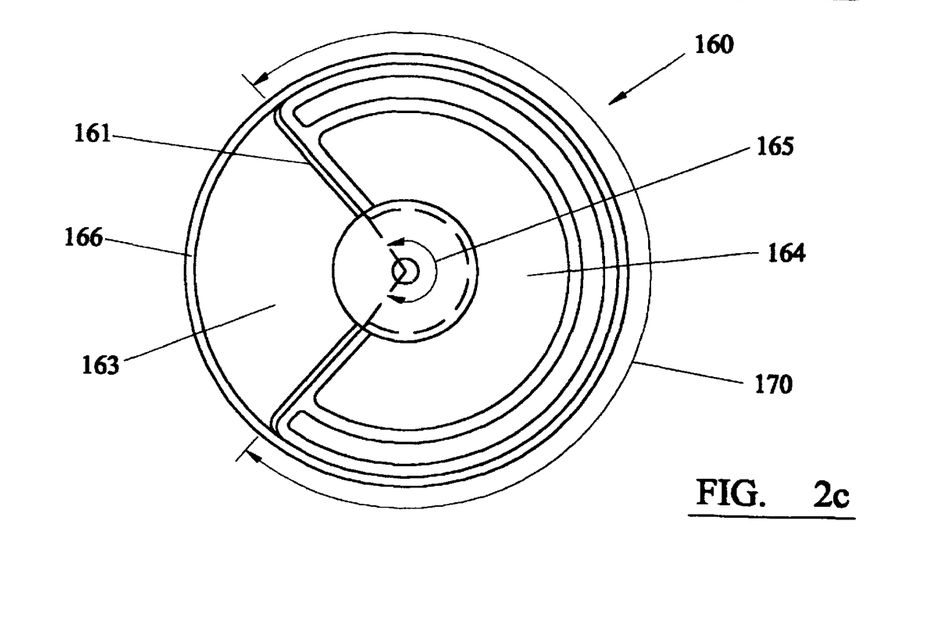
Figure 3A:
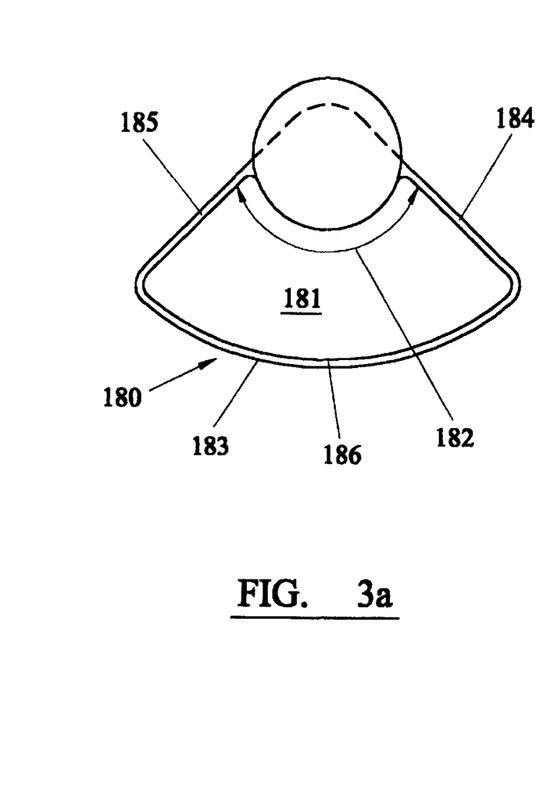
FIGS. 3a, 3b, 3c and 3d show top, side, bottom and isometric views respectively of a second flow guide part of the invention.
Figure 3B:
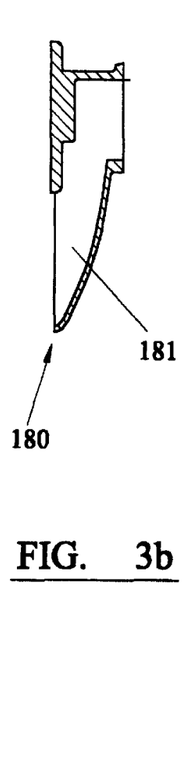
Figure 3C:
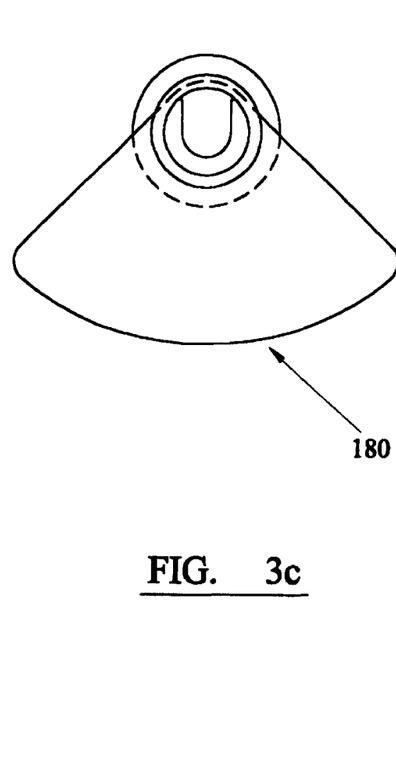
Figure 3D:
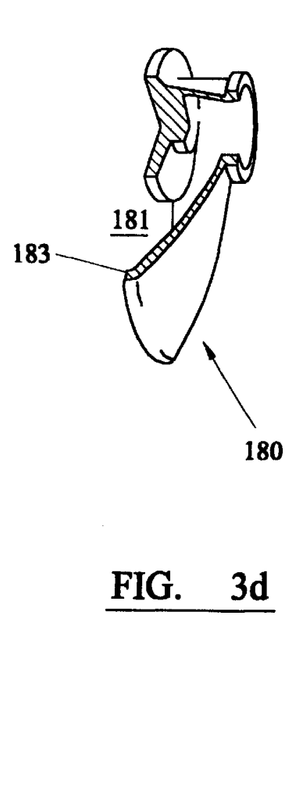

FIGS. 2a to 2c, together with FIG. 1, show a first flow guide 160 which is shown inverted in FIG. 1. The first flow guide is in the form of a circular cowl. The first flow guide has a septum 161 in the form of a divider wall which divides the first flow guide into a primary gas chamber 162 and a separate secondary gas chamber 163. The first flow guide has a primary gas inlet 164 which extends over an inlet angle 165. Preferably, the inlet angle is at least about 180°, more preferably at least about 240°. Preferably, the inlet angle is not more than about 330°, more preferably not more than about 290°. In this case the inlet angle is approximately 270°. The first flow guide has a guiding edge 166 with a lip 167 which extends around the circumference of the flow guide. A coalescing device 168 in the form of an open cell foam pad is provided in the primary gas inlet 164 (not shown in FIGS. 2a to 2c). The first flow guide has an flange 169 which acts as a partition in a drain part of the dryer as will be described later.

In the dryer, the first flow guide is presented with its bottom facing the first end surface of the drying drum. As the flow guide rotates, a sector with a fixed first angle corresponding to inlet angle 165 is traced on the end surface of the drying drum. The divider wall 161 and an arc 170 of the guiding edge define the boundaries of the sector traced out on the end surface of the drying drum and define a region in which primary gas is constrained to enter the drying drum. The divider wall 161 and the remaining arc of the guiding edge define the boundaries of a further sector traced out on the first end surface of the drying drum as the flow guide rotates which defines a region in which secondary gas exits the drying drum. The configuration of the guiding edge and divider ensure that the primary gas chamber 162 and secondary regenerating gas chamber 163 are kept separate.

The configuration of the first flow guide is chosen so as to ensure that when mounted on the drive shaft and located by the locating means 155, the guiding edge 166 is positioned at a controlled clearance from the first end face of the drying drum. One way of configuring the flow guide is by selecting the displacement 174 between a contact point 172 end face and an end face 173 of the guiding edge. The controlled clearance can be chosen to ensure that the guiding edge is sufficiently close to prevent significant egress of gas from either chamber while preventing contact with the drying drum surface and thereby preventing damage to the drying drum and reducing friction in the dryer. Preferably, the clearance is at least about 0.1 mm, more preferably at least about 0.2 mm. Preferably, the clearance is not more than about 1.0 mm, more preferably not more than about 0.6 mm. For example, a clearance of 0.3 mm has been found to be effective in practice. A knife edge, rather than flat, guiding edge may be provided. The knife edge might fit into a cooperating groove in the end surface of the drying drum, or the knife edge may be allowed to cut its own groove in the end surface to provide a self seal.

FIGS. 3*a* to 3*d*, together with FIG. 1, show a second flow guide 180 which is in the form of a sector of a circular cowl which defines a second secondary gas chamber 181. The second secondary gas chamber extends over a fixed second angle 182. Preferably, the second angle is at least about 45°, more preferably at least about 60°. Preferably, the second angle is not more than about 180°, more preferably not more than about 120°, In this case the fixed second angle 182 is approximately 90°. A guiding edge 183 of the second flow guide is provided by radial walls 184, 185 and an arcuate wall 186.

The second flow guide traces out a sector over the second end surface of the drying drum and the guiding wall defines a region in which secondary regenerating gas enters the drying drum, constrained by the guiding edge. The first and second flow guides are mounted concentrically on a common axis and their relative angular positions are arranged such that the sector traced out on the second end surface by the second secondary gas chamber and the sector traced out on the first end surface by the secondary gas chamber of the first flow guide match approximately, in the sense that they could be mapped onto each other by a translation along the rotational axis. The angular matching of equal sectors of the ends of the drying drum provides a regenerant gas path through the drying drum which can be rotated around the drying drum by rotation of the first and second flow guides.

Figure 4:
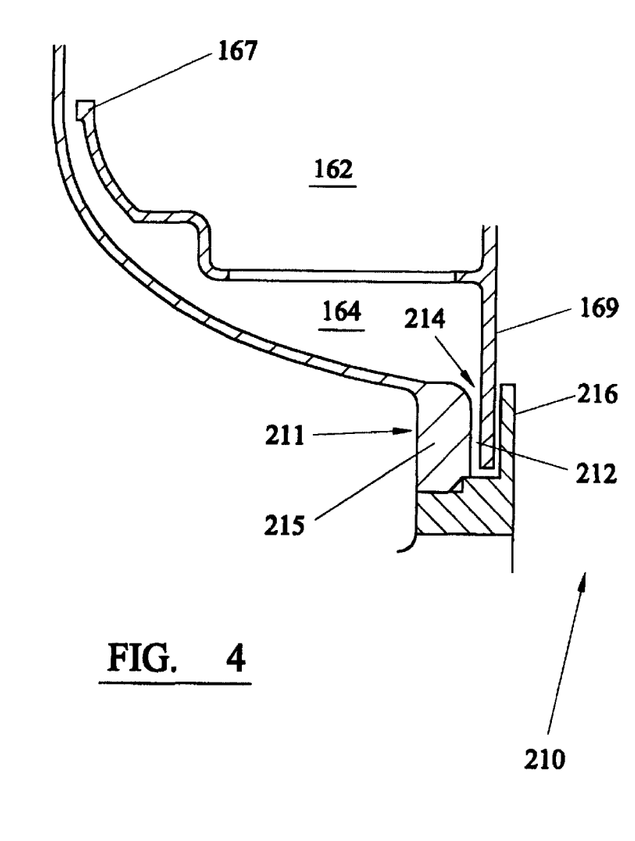
FIG. 4 shows a cross-sectional view along line AA' of FIG. 1 of a drain part of the invention.
Figure 5:
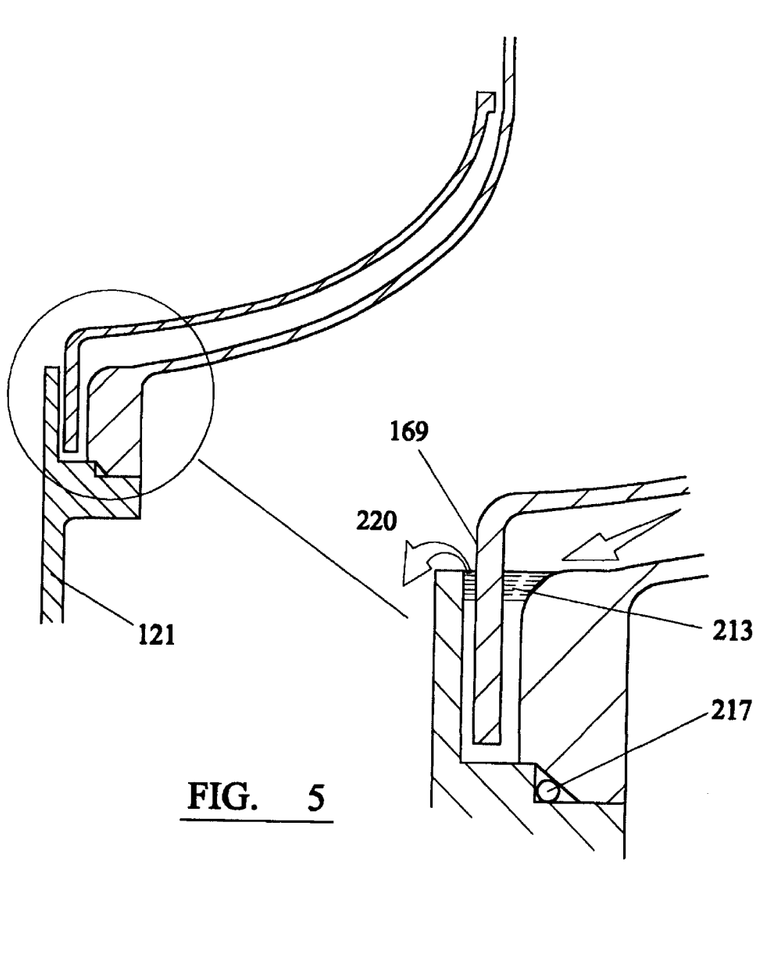
FIG. 5 shows an enlarged detail of FIG. 4 illustrating the egress of liquid.

FIGS. 4 and 5, together with FIG. 1, show a drain 210 which can be located in a bottom end 211 of the housing 110. The first flow guide defines a primary gas chamber 162 from which primary gas to be dried can pass into the drying drum. The first flow guide also defines a secondary gas chamber 163 into which secondary regenerating gas passes from the drying drum. A partition 169 is provided. The drain includes a liquid trap 212 into which the partition extends to define a U-shaped space for storing trapped liquid 213. The liquid trap is in the form of an annular channel 214. An outer wall 215 of the channel is formed by a part of the housing and an inner wall 216 is formed by a part of the outlet port 121 of the dryer. A seal 217 is provided between the outlet port and the housing.

In use, a primary gas 117 to be dried is fed into the first chamber 140 through the inlet port 116. As the inlet port directs the gas flow to be tangential to the surfaces of the annular first chamber, a rotational flow pattern of primary gas is induced. The rotational flow pattern causes droplets of liquid entrained in the primary gas to be directed towards the inner surface of the housing owing to the centrifugal force they experience. The droplets deposited on the inner surface of the housing stream toward the bottom of the housing and collect in the liquid trap of the drain. This provides one mechanism of primary separation. Vapour entrained in the primary gas flow may condense on the inner surface of the housing and on the relatively cool metal jacket of the drying drum and again stream and drip down to the bottom of the housing to collect in the liquid trap. This provides a further mechanism for primary separation. The liquid stored in the liquid trap prevents the egress of the primary gas out of the primary gas chamber 162 and out of the housing via the drain 210.

The first and second chambers of the housing are separated by the continuous support and so the only path available for the primary gas is through the drying drum. Firstly the primary gas passes through the primary gas inlet 164 of the first flow guide and into the coalescing pad so as to remove any remaining liquid. Liquid from the coalescing pad drips into the bottom of the housing and on to the liquid trap.

The primary gas is then directed into the drying drum by the first flow guide and prevented from escaping from the first flow guide by its guiding edge. The primary gas then passes through the drying drum and vapour is removed form the primary gas. Dried primary gas then exits the second end of the drying drum and exits the housing via the outlet port 118 and the dried gas 119 is fed on up stream. When entering the housing the primary gas is typically at a temperature of between 25 to 40° C. The contact time of the primary gas and the drying drum during transit of the primary gas is typically of order a few seconds, for example 2 seconds. The operating pressure inside the pressure housing is typically a few bar, for example about 10 bar. The rate of rotation of the flow guides is typically of order a few revolutions per hour, for in the range 6 to 10 rev.h$^{-1}$.

A secondary gas is fed into the housing through the secondary gas inlet port 120 and enters the secondary gas chamber of the second flow guide. The second flow guide prevents the mixing of the dried primary gas and the secondary regenerating gas. The secondary gas can be supplied as a portion of the compressed gas from an upstream compressor used to compress the primary gas. The portion need not be fed through an intercooler and so enters the housing at elevated temperature, perhaps of over 100° C., for example in the range 140 to 190° C. The hot secondary gas is directed by the second flow guide to enter the drying drum over a sector traced out by the flow guide as it rotates and passes through the drying drum regenerating the adsorbent material owing to its heat. As the sector traced out by the second flow guide matches the sector traced out by the secondary gas chamber 163 of the first flow guide, a regenerating region is defined in the drying drum through which regenerating gas only flows, without mixing with primary gas.

The regenerating secondary gas then passes through the drain and out of the housing through the secondary gas outlet port 121. The secondary gas can then be cooled and passed back into the primary gas stream in a closed loop. As the secondary gas is not allowed to expand significantly, the initial energy of compression is not lost form the system and so costs are minimized.

There is a slight pressure gradient of order a few millibars over the partition between the primary gas chamber and the secondary gas chamber which causes the egress of liquid trapped in the liquid trap to drain out of the housing. Further the flow of the secondary gas over the drain side of the liquid trap tends to induce turbulence in region 220 providing a region of low pressure which also causes the egress of liquid from the liquid trap and out of the primary gas chamber. It will be appreciated that the liquid trap and partition provide a virtually friction less rotating seal which allows the egress of liquid from the primary gas chamber but not the egress of primary gas.

In an alternative construction, a conventional bearing seal can be used to maintain the pressure differential between the primary and secondary gas chambers. The resistance to rotation of the drum that arises from use of such a seal will generally be small because of the small diameter of the seal compared with the size of the drum. The discharge of collected liquid from the dryer housing can then be controlled by means of a drain as used conventionally for draining liquid from pressurised gas systems. An example of a drain with suitable operating parameters is disclosed in EP-A-81826.

A considerable number of benefits are provided by the drum dryer of the current invention. A lower power and less complicated drive can be used compared to rotating drum dryers for a number of reasons: the mass of the drum is supported; a lower inertial mass is being driven; seals for accommodating rotation, and which are provided to separate the primary and secondary gas flows, are provided close to the axis of rotation rather than around the periphery of the drum. The drum is fully supported and fixed in place, so that the parts for mounting the drum need not be capable of both supporting the drum and enabling it to rotate. A single diameter drive shaft can be used and so a metal rod can be used rather than having to machine a particular profile. The drive shaft for rotation can be mounted at both ends. The drive shaft for rotation only carries the means for separating the primary and secondary gas flows: it does not carry the drum itself. Integral primary separation of liquid entrained in the primary gas stream can be provided by the long, generally tangential flow path between the outside of the drum and the internal housing surfaces. The egress of liquid without primary gas is provided for with a virtually frictionless rotational seal. The clearance of the flow guides from the drying drum can be accurately controlled by biassing the flow guide, drying drum, flow guide sandwich so as to prevent damage to the drum and further friction. The loss of energy by re-expanding compressed gas is avoided by a closed system.

What is claimed is:

1. A gas dryer comprising;
   (a) a drying drum which contains an adsorbent material and is arranged for a gas to flow through it to be dried from the bottom end of the drum to its top end,
   (b) a housing in which the drum is located with a space around the drum between the internal wall of the housing and the external surface of the drum,
   (c) a housing inlet for the gas to be dried through which gas can be directed into the said space, to flow in the space to the bottom end of the drum where it can be admitted into the drum for drying, the housing inlet being located on the housing so that the ratio of the distance from the inlet to the bottom end of the drum to the overall length of the drum is at least about 0.25, and being arranged so that the gas is directed to flow around the drum axis in the space between the internal wall of the housing and the external surface of the drum with a generally tangential flow direction relative to the surface of the drum, from the housing inlet to where it enters the drum at the bottom end thereof, and
   (d) a drain located towards the bottom of the housing, through which collected liquid can drain from the housing.

2. A dryer as claimed in claim 1, in which the cross-section of at least one of the drum and the housing is substantially circular.

3. A dryer as claimed in claim 1, in which the drying drum has a circular cylindrical shape.

4. A dryer as claimed in claim 1, in which the external surface of the drum is provided by a metal jacket.

5. A dryer as claimed in claim 1, in which the ratio of the distance of the inlet to the bottom end of the drum to the overall length of the drum is at least about 0.45.

6. A dryer as claimed in clam 1, which includes a coalescing device for collecting aerosol droplets of liquid that are entrained in the gas flowing towards the drum.

7. A dryer as claimed in claim 1, in which the drying drum is fixed against movement relative to the housing.

8. A dryer as claimed in claim 1, in which the space between the housing and the drum is divided into first and second chambers, and in which gas is only able to flow between the said chambers through the drying drum.

9. A dryer as claimed in claim 1, in which includes a first flow guide at the bottom of the drum and a second flow guide at the top of the drum, which define between them a region of the drum for a primary gas to flow through the drum, and a secondary region of the drum for a secondary gas to flow through the drum, the flow guides being mounted for rotation about the drum axis so that boundaries between the primary and secondary regions rotate around the drum, the permeable structure of the drying drum and the flow guides allowing the primary and secondary gases to flow through their respective regions of the drum without significant mixing.

10. A dryer as claimed in claim 9, in which the first and second flow guides rotate about a common axis.

11. A dryer as claimed in claim 10, in which the dryer includes a drive shaft which passes through the centre of the drying drum and the first flow guide is mounted on the drive shaft at the bottom of the drum and the second flow guide is mounted on the drive shaft at the top of the drum.

12. A dryer as claimed in claim 9, in which the first and second flow guides are configured such that the leading edges of the flow guides are maintained at a controlled clearance from the respective ends of the drying drum so as to prevent significant egress of gas from the flow guides, while preventing contact of the guiding edges with the respective ends of the drying drum.

13. A dryer as claimed in claim 1, which includes a support extending between en internal surface of the housing and a side wall surface of the drying drum, to fix the drum against movement relative to the housing and to support the drum in the housing.

14. A dryer as claimed in claim 13, in which the support contact the side wall surface of the drum at a point between its ends.

15. A dryer as claimed in claim 13, in which the housing has fist part and a second part joined at an interface and the support is attached to the housing at the interface.

16. A dryer as claimed in claim 15, in which tho support is secured to the housing at the interface between the two parts thereof.

17. A dryer as clued in claim 13, in which the support divides the housing into first chamber and second chambers, such that gas can only pass between the first and second chambers through the drum.

18. A dryer as claimed in claim 1, in which the drying drum has a primary region for the primary gas to flow through it in which liquid in the gas is adsorbed by the drum as it flows from the bottom of the drum to the top, and a secondary region for a secondary gas to flow trough to regenerate the drum by displacing adsorbed liquid, the drum including a drain at the bottom end of the housing for removing liquid from the housing, and a partition at the bottom end of the drum which defines a primary gas chamber that communicates with the primary region of the drum, and a secondary gas chamber that communicates with the secondary region of the drum, the dryer including a liquid trap into which liquid in the primary chamber drains, the partition extending into the trap so that, when the dryer is in use, it extends into collected liquid in the trap to provide a seal against gas flow between the primary and secondary gas chambers.

* * * * *